United States Patent [19]
Brown

[11] 3,805,470
[45] Apr. 23, 1974

[54] GLAZING GASKET ASSEMBLY

[75] Inventor: Howard R. Brown, Bowling Green, Ohio

[73] Assignee: The D. S. Brown Company, North Baltimore, Md.

[22] Filed: Oct. 5, 1972

[21] Appl. No.: 295,101

[52] U.S. Cl. ................................... 52/400, 52/397
[51] Int. Cl. ........................ E04b 1/62, E06b 3/62
[58] Field of Search ............................ 52/397–400, 52/403, 208, 209, 498, 402, 303, 616, 628, 235, 464, 468, 393; 49/485, 488, 504

[56] References Cited
UNITED STATES PATENTS

| | | | |
|---|---|---|---|
| 2,701,041 | 2/1955 | Toth | 52/398 |
| 3,571,994 | 3/1971 | Brown | 52/400 |
| 3,722,161 | 3/1973 | Brown | 52/397 |
| 3,590,539 | 7/1971 | Brown | 52/403 |
| 3,411,247 | 11/1968 | Fleming | 52/616 |
| 3,527,011 | 9/1970 | Bloom | 49/504 |
| 3,680,276 | 8/1972 | Wright | 52/398 |
| 3,698,148 | 10/1972 | Marantier | 52/498 |

FOREIGN PATENTS OR APPLICATIONS

| | | | |
|---|---|---|---|
| 1,466,532 | 12/1966 | France | 52/398 |

Primary Examiner—Frank L. Abbott
Assistant Examiner—Mark H. Wolk
Attorney, Agent, or Firm—Owen & Owen; Vincent L. Barker, Jr.

[57] ABSTRACT

A glazing gasket assembly is disclosed which comprises a four-piece construction for providing a continuous outer gasket or glazing surface between adjacent glass panes having a rigid channel member interposed between the panes. The continuous glazing surface is made up from the outer surface of oppositely extending gasket members connected to and overlapping opposite outer edges of the channel member and a plug member having an outer base in contiguous relationship with the opposing first gasket members.

1 Claim, 3 Drawing Figures

PATENTED APR 23 1974　　3,805,470
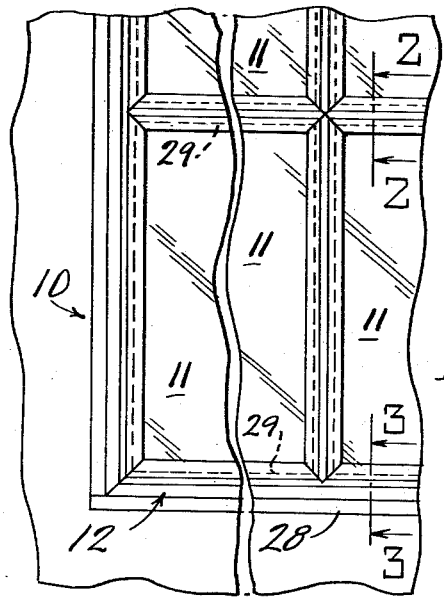
FIG-1-
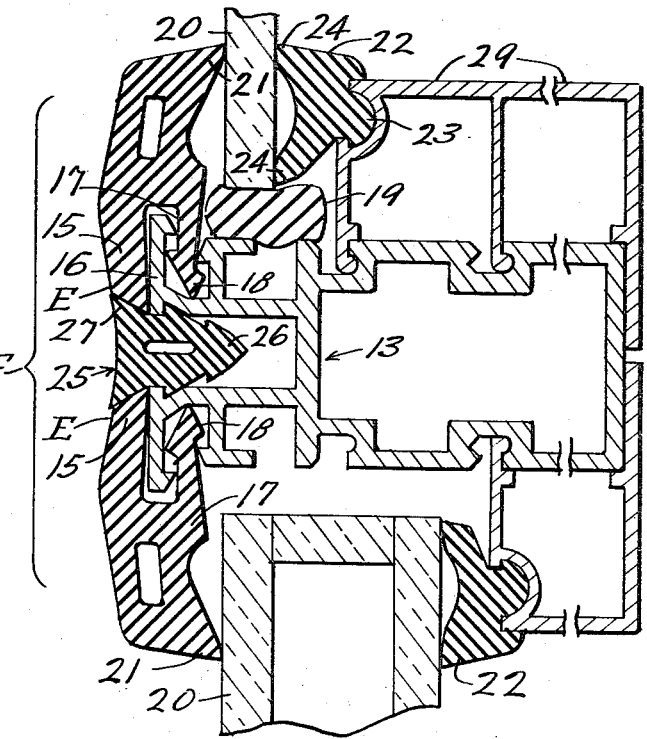
FIG-2-
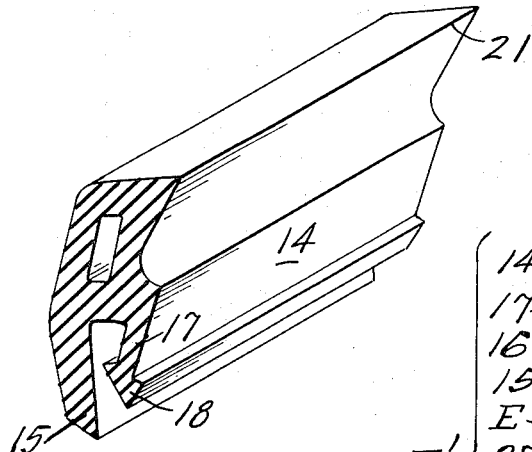
FIG-4-
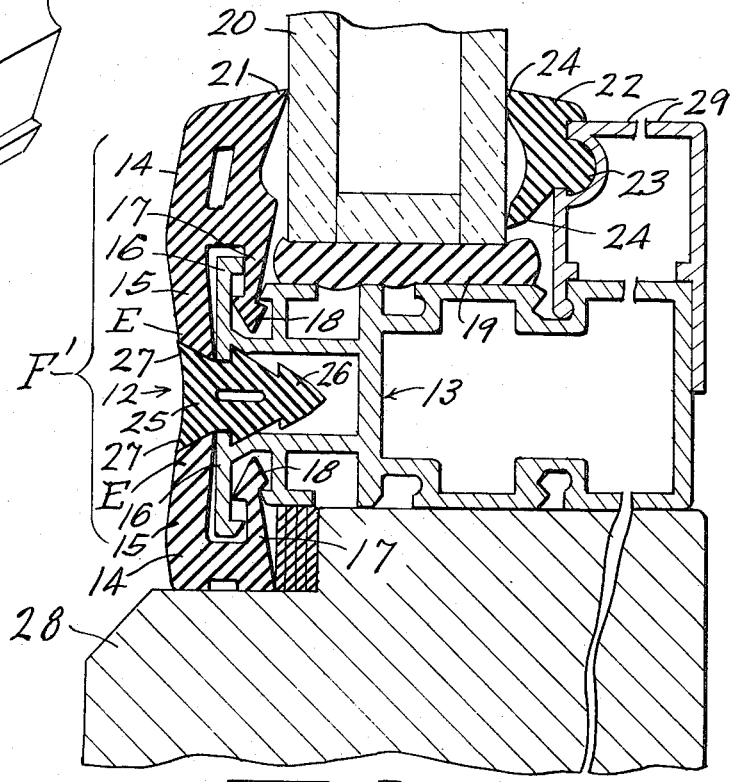
FIG-3-

GLAZING GASKET ASSEMBLY

BACKGROUND OF THE INVENTION

Various designs of extruded resilient glazing gaskets for positioning and sealing a glass pane relative to its rigid building framing member have been utilized to reduce expensive procedures involved in conventional glass installations, especially in modern building constructions where extensive use of glass is made for architectural and functional purposes. One such construction is shown in my copending application Ser. No. 91,035 filed Nov. 19, 1970, now U.S. Pat. No. 3,722,161 issued Mar. 27, 1973, in which a glazing gasket construction overlaps a rigid channel member between two glass panels and abuts an oppositely disposed gasket member to form an outer seal. Such a glazing gasket construction may be less suitable when the rigid channel member is made extremely wide for architectural or structural reasons. In such an event, the portion of the glazing gasket overlapping the outer facing portion of the channel member may not remain tightly against the channel member and may thus be unsightly.

It is the object of this invention to provide a glazing construction which provides a continuous glazing surface between adjacent coplanar glass panels where the channel member provides a large space between the glass panes. By "continuous glazing surface" as used herein, the outer exposed area between adjacent panes or the outer exposed areas along the periphery of a pane is defined, as will be more fully explained below.

SUMMARY OF THE INVENTION

The invention is a glazing gasket assembly for use as a junction for coplanar spaced glass panels of a curtain wall wherein a rigid channel member is interposed between the spaced glass panels. The gasket assembly comprises an outer, first gasket member extending along the channel member. The first gasket member has an outer leg for overlapping an outer-facing portion of the channel member and an inner leg spaced from and parallel to the outer leg for engagement with the channel member. A body portion is connected to the outer and inner legs and has a sealing lip which engages an outer side of one of the glass panes. A second gasket member, connected to the channel member, has a second sealing lip which engages an opposing inner side of one of the glass panes. A plug member is inserted in the channel member having a flared base portion in contact with the opposed extremities of the outer legs of opposing first gasket members supporting adjacent spaced glass panels. A pad support extends within the channel member to resiliently support the glass panel within the glazing gasket assembly.

BRIEF DESCRIPTION OF THE DRAWINGS

FIG. 1 is a view in elevation of a curtain wall assembly incorporating the glazing gasket construction of the present invention;

FIG. 2 is a cross-sectional view taken along line 2—2 of FIG. 1 and shown on an enlarged scale;

FIG. 3 is a cross-sectional view taken along line 3—3 of FIG. 1, also shown on an enlarged scale; and FIG. 4 is a perspective view of part of the glazing gasket assembly of the present invention.

DESCRIPTION OF THE PREFERRED EMBODIMENT

Referring to FIG. 1, a curtain wall 10 having coplanar spaced glass panes 11 sealed at their edges by the glazing gasket assembly 12 of the present invention is shown. Referring to FIG. 2, the glass panes 11 are separated by a rigid channel member 13 which defines a window opening. The glazing gasket assembly 12 comprises a first resilient gasket member 14 having an outer leg 15 overlapping an outer facing portion 16 of the rigid channel member 13. An inner leg 17 is parallel to the outer leg 15 and in locking engagement with the rigid channel member 13 by means of a foot 18 extending along the base of the inner leg 17. Still referring to FIG. 2, a resilient pad member 19 is placed upon the rigid channel member 13 and extends along the length thereof adjacent the inner leg 17 along the bottom of the pane. A pane of glass 20 rests upon the pad member 19. A body section 21 of the first gasket member 14, connected to the outer leg 15 and the inner leg 17, carries a first resilient sealing lip 21 which presses in sealing engagement against the glass pane 20.

An inner gasket member 22 comprising a body portion 23 and having upper and lower second sealing lips 24 is in sealing engagement with the opposite inner side of the glass pane 20. A shaped protrusion on the body portion 23 is wedged within a complementarily shaped recess on the channel member 13 to hold the gasket member 22 in place. A plug member 25 comprising a barbed nose portion 26 for engagement with the channel member 13 extends along the channel member 13 in engagement with an end portion E of the outer leg 15. A flared portion 27 of the plug member 25 lies in overlapping engagement with the end portion E to force the end portion tightly against the rigid channel member 13.

Still referring to FIG. 2, when upper and lower coplanar spaced glass panes 20 are held in sealing engagement by the glazing gasket assembly 12, the upper and lower first gasket members 14 in engagement with the glass panes 20 are oppositely disposed with end portions E of the outer legs 15 in contact with opposite sides of the flared portion 27 of the plug member 25. The resultant outer face presents the continuous glazing surface as referred to above and as designated by bracket F in FIG. 2. As shown in FIG. 2, the invention through use of selected channel pieces, can be utilized with both single or double pane glass.

Referring to FIG. 3, the glazing gasket assembly 12 also provides a continuous seal from a lower window sill 28 to a lowermost glass pane 20 of a curtain wall 10. In this lowermost position, opposing first gasket members 14 and the plug member 25 are arranged in identical fashion as described above to form a continuous glazing surface from the glass pane 20 to the window sill 28, as indicated by the bracket F.

Use of the glazing gasket assembly 12 provides a means for simple installation of the glass pane 20 from either the outside or inside of the building. For example, for an inside installation, the removable portions of this channel member, designated by reference numeral 29, is not in place as the outer gasket member 14 is located in place adjacent the flared portion 27 of the plug member 12. The pad member 19 is inserted in the channel member 13 and a glass pane 20 is placed from inside the window frame on the pad member 19, against the first sealing lip 21. The channel portions 29 are then snapped in place. The second inner gasket member 22, having the second sealing lips 24, is then placed against the inner side of the pane 20 and inserted on the inner side of the rigid channel member portion 29 to effect a seal and support for the pane 20.

It will be apparent to those skilled in the art that the preferred embodiment of the invention thus described enables the installation of large window panes without disadvantages encountered when using prior art constructions especially in the case of installations of very large glass panes at high elevations above street level. The construction is to be utilized on all four sides of a window or, with certain design modifications, may be used on round, oval or arcuate shaped window installations so that the relative terms used in the description and claims hereof in defining the various parts of the invention are applicable to all such installations.

What I claim is:

1. A glazing construction for glass panes of a curtain wall, said construction including a resilient gasket assembly and a rigid channel member interposed between the spaced apart adjacent glass panes, said channel member including an outer portion positioned on one side of the glass panes and an inner portion on the other side thereof, said resilient gasket assembly comprising a pair of oppositely disposed first gasket members extending along the outer portion of said channel member, said first gasket members each comprising an outer leg overlapping the outer portion of said channel member with each outer leg extending away from a glass pane and towards its oppositely disposed mate, an inner leg spaced from and parallel to said outer leg in locking engagement with said outer portion of said channel member and a sealing member connected to said outer and inner legs and extending toward the glass pane in sealing engagement with one side of the pane, a second gasket member connected to the inner portion of said channel member, said second gasket member having an inner sealing segment in sealing engagement with the other side of the glass pane, and a plug member connected to the outer portion of said channel member, said plug member including means for gripping said channel member and enlarged base means extending along said channel member in engagement with the opposed extremities of said oppositely disposed outer legs of said first gasket members for maintaining said outer legs in overlapping relationship with said outer portion of said channel member to provide a continuous weather seal over said channel member between adjacent glass panes.

* * * * *

UNITED STATES PATENT OFFICE
CERTIFICATE OF CORRECTION

Patent No. 3,805,470          Dated April 23, 1974

Inventor(s) Howard R. Brown

It is certified that error appears in the above-identified patent and that said Letters Patent are hereby corrected as shown below:

Assignee's address should be --North Baltimore, Ohio-- not "North Baltimore, Md.".

Signed and sealed this 6th day of August 1974.

(SEAL)
Attest:

McCOY M. GIBSON, JR.          C. MARSHALL DANN
Attesting Officer             Commissioner of Patents